3,210,194
ADMINISTRATION OF 2-MERCAPTOIMIDAZOLE COMPOUNDS TO MEAT-PRODUCING RUMINANTS
Wise Burroughs, Ames, Iowa, assignor to Iowa State University Research Foundation, Inc., Ames, Iowa, a corporation of Iowa
No Drawing. Filed Aug. 21, 1961, Ser. No. 132,558
7 Claims. (Cl. 99—2)

This invention relates to the administration of 2-mercaptoimidazole compounds to meat-producing ruminants. More particularly the invention relates to a method of enhancing the effectiveness of a 2-mercaptoimidazole compound when orally administered to meat-producing ruminants for promoting growth and feed utilization. The invention also relates to compositions which are especially adapted for use in practicing the method. The invention is particularly applicable to immature, growing beef cattle and sheep. Beef cattle and sheep are the principal meat-producing ruminants in the United States.

For example, under certain conditions the oral administration of 1-methyl 2-mercaptoimidazole to beef cattle has resulted in substantial improvement both in the rate of weight gain and in the feed efficiency. Particularly good results have been obtained when the 2-mercaptoimidazole compound has been administered in combination with an estrogen like diethylstilbestrol, as described in copending application Serial No. 793,668, filed February 17, 1959, now Patent No. 3,041,173.

One limiting factor which has been encountered in the use of 2-mercaptoimidazole compounds with ruminants is that the growth promotant response can be obtained only for relatively limited periods of time. More specifically, the maximal response has usually been obtained in the first thirty days, while the response diminishes during the next thirty days. Since beef cattle are commonly fed for periods of 100 to 150 days, it would be desirable to provide means for extending the length of time during which an appreciable growth promotant effect can be obtained with a 2-mercaptoimidazole compound.

Even during the first 60 days of use the results obtained with 2-mercaptoimidazole compounds have not always been satisfactory. The increase in the rate of weight gain and the improvement in feed efficiency has tended to be variable, and negative results have been obtained in a few instances. Heretofore there has been no satisfactory explanation for the variability of response. It is therefore desirable to provide a means for improving the uniformity and reproducibility of the growth promotant response from 2-mercaptoimidazole compounds.

Summarizing, it is a principal object of this invention to provide a method of enhancing the effectiveness of a 2-mercaptoimidazole compound when orally administered to meat-producing ruminants. It is desired to provide means for further improving the rate of weight gain and feed efficiency, and for obtaining the desired improvements over extended periods of time. Further objects and advantages will be indicated in the following detailed specification.

This invention is based in part on the discovery that the quantity of vitamin A received by the ruminants can markedly affect the growth promotant response from a 2-mercaptoimidazole compound. The relationship is complex, but speaking generally if the quantity of vitamin A in the diet is excessive the response obtained with the 2-mercaptoimidazole compound will be reduced. At higher levels of vitamin A no significant benefit from the 2-mercaptoimidazole administration may be obtained, and the rate of weight gain and feed efficiency may even be reduced below that which would have normally been obtained. The relationship is further complicated by the fact that the animals should receive at least enough vitamin A to meet their minimum nutritional requirements and to avoid any marked vitamin A deficiency.

In practicing the method of this invention, it has been found desirable to employ at least two different feeding regimens in successive time periods. More specifically, during the first phase of the 2-mercaptoimidazole administration the diet for the ruminants should contain an average of less than 1500 International Units (I.U.) of vitamin A activity per pound of ration. It will be understood that this is on a total ration basis. The results are still further improved when the vitamin A level in the first phase is limited to less than 800 I.U. per pound of ration. Since the natural feed materials included in the diet of the animals will normally supply a considerable amount of vitamin A activity as carotene (e.g., B-carotene) the natural vitamin A precursor (sometimes referred to as provitamin A), it will normally not be either necessary or desirable to add vitamin A to the feed materials being administered to the ruminants during the initial feeding period. In fact, it will usually be necessary to limit the intake of high carotene ration ingredients, such as natural hays and fodders, to assure that the total vitamin A activity in the complete ration is below the limit specified. In other words, while the diet during the first phase of the 2-mercaptoimidazole administration may contain some true vitamin A, most of the vitamin A activity will normally be present primarily in the form of carotene.

Since immature, growing beef cattle and sheep eat an amount of feed in 24 hours corresponding to approximately 3% of their body weight, the foregoing vitamin A levels can also be expressed in terms of animal body weight. For example, the vitamin A level for beef cattle and sheep during the first phase of the 2-mercaptoimidazole administration is preferably limited to less than 2,400 I.U. of vitamin A per 100 pounds of body weight. In all cases, the diet for the animals during the first phase should contain less than 4,500 I.U. of vitamin A per 100 pounds of body weight per 24 hours.

The first phase of the 2-mercaptoimidazole administration, as described above, should preferably extend for at least 30 days. For example, in one preferred embodiment the 2-mercaptoimidazole administration is continued for more than 60 days and the first phase of the administration extends over most of the first 60 days, while the second phase of the administration, as will be subsequently described in detail, extends substantially beyond the first 60 days. By way of specific illustration, the first phase could extend for a period of from 45 to 60 days, while the second phase lasted for a period of from 30 to 90 days.

During the second phase of the 2-mercaptoimidazole administration, the carotene level in the feed appears to be of lesser importance than during the first phase. After the 2-mercaptoimidazole compound has been administered for from 30 to 60 days, the conversion of carotene to vitamin A by the animal seems to be largely blocked. This makes it easier to control the amount of vitamin A below that which would interfere with the 2-mercaptoimidazole response, but at the same time it may tend to result in a condition of vitamin A deficiency where the animal is largely dependent on carotene as the vitamin A source. Consequently, in the second phase of the 2-mercaptoimidazole administration, as contemplated by the present invention, the ruminants are fed a diet containing supplementary vitamin A in the form of true vitamin A in an amount ranging from 100 to 1,500 I.U. per pound of ration on a total ration basis. The preferred level is fom 200 to 1,000 I.U. per pound of ration. Expressed ifferently, the quantities of vitamin A received by the animals during the second phase of the 2-mercaptoimidazole administration should be kept within the range from 500 to 4,500 I.U, and preferably from 600 to 3,000 I.U. of vitamin A per 100 pounds of body weight per 24 hours.

In practicing the method of this invention, the 2-mercaptoimidazole compound can be selected from the group consisting of 2-mercaptoimidazole and 1-alkyl 2-mercaptoimidazoles wherein the alkyl group contains from one to five carbon atoms. One preferred compound is 1-methyl 2-mercaptoimidazole. Other compounds having similar properties are 2-mercaptoimidazole, 1-ethyl 2-mercaptoimidazole, 1-propyl 2-mercaptoimidazole, 1-butyl 2-mercaptoimidazole, and 1-isopentyl 2-mercaptoimidazole.

The quantity of the 2-mercaptoimidazole compound to be employed will be substantially in accordance with prior practice. Speaking generally, at least 10 milligrams (mg.) but not over 150 mg. of the 2-mercaptoimidazole compound should be employed per 100 pounds of body weight per 24 hours. The optimum amounts will usually fall within the range from 25 to 100 mg. per 100 pounds of body weight per 24 hours. For beef cattle of the size which are normally being fattened for market, a dose of from 200 to 1,000 mg. of the 2-mercaptoimidazole compound per animal per 24 hours can be used, while for sheep the dose will be correspondingly smaller, for example, from 20 to 100 mg. of the 2-mercaptoimidazole compound per animal per 24 hours. As a matter of convenience, the quantity of the 2-mercaptoimidazole compound administered can be the same during the first and second feeding period, although ideally the quantity should be increased in proportion to the increase in body weight of the animals.

In practicing the present invention, it will be convenient to administer the 2-mercaptoimidazole compound as an ingredient in a beef cattle or sheep protein feed supplement. Such supplements are commonly fed to beef cattle in amounts of 1 to 2 pounds per day, while sheep may receive from 0.1 to 0.2 pound per day. Depending somewhat on the amount fed, said protein feed supplements for use in accordance with the present invention can contain from 150 to 1,000 mg. of 2-mercaptoimidazole compound per pound. If desired the 2-mercaptoimidazole compound can be included in a complete ration for the beef cattle or sheep. Usually the dosages can be computed with sufficient accuracy on the assumption that the animals will eat about 3% of their weight per day.

For use in practicing the second phase of the method of this invention, the protein feed supplement or complete ration should contain supplemental vitamin A as true vitamin A. Preferably, from 6 to 120 I.U of vitamin A is present per milligram of the 2-mercaptoimidazole compound. In addition to the 2-mercaptoimidazole compound and the vitamin A, the protein feed supplement will contain feed ingredients having a relatively high protein content, such as soybean meal, cottonseed meal, etc. It will be understood, however, that the 2-mercaptoimidazole compound and the vitamin A may be combined with other feed ingredients, either as a premix, a feed supplement, or a complete feed ration. The feeds and feed compositions used in practicing the present invention may also contain other growth promotants such as diethylstilbestrol.

The following examples illustrate the method and feed compositions of this invention in greater detail.

*Example 1*

Five hundred grams of 1-methyl 2-mercaptoimidazole in the form of a fine dry powder is thoroughly mixed and blended in 9 pounds of soybean meal. When the 1-methyl 2-mercaptoimidazole compound has been distributed throughout the soybean meal, a resulting first premix product will contain 50 grams of the 1-methyl 2-mercaptoimidazole compound per pound of the product.

This premix product prepared as described above can then be used to prepare a first feed ration or protein supplement for administration to beef cattle during the first phase of the feeding regimen comprising a period of about 60 days. For example, 10 pounds of the premix can be mixed with 1,990 pounds of beef cattle protein supplement which is essentially devoid of carotene and vitamin A. Such supplements are principally composed of vegetable protein sources such as soybean meal, cottonseed meal, linseed meal, wheat middlings, etc. After the premix has been thoroughly distributed throughout the protein supplement, a ton of feed material utilizable in the first feeding period of this invention will be obtained. This material will contain 250 milligrams of 1-methyl 2-mercaptoimidazole per pound adapted for use as a beef cattle protein supplement for feeding during the first 60 day period.

During the second phase of the feeding regimen extending over an additional period of about 60 days, the feed ration or protein supplement fed to beef cattle is prepared similar to that used in the first feeding period except that a controlled amount of true vitamin A is incorporated. For example, a second protein supplemental feed is fed during this second feeding period by first preparing a second premix. Five hundred grams of 1-methyl 2-mercaptoimidazole and 8 million International Units of vitamin A are thoroughly dispersed on 8.5 pounds of soybean meal to make 10 pounds of second premix. This 10 pounds of second premix is thoroughly mixed with 1,990 pounds of other protein supplemental ingredients as described above to make one ton of protein supplement well suited for feeding during this second 60 day period.

*Example 2*

In practicing the method of this invention it is preferred to utilize steers, although the method is also applicable to heifers. By way of specific example, yearling steers weighing an average of 800 pounds can first be fed for 60 days a ration which includes the first protein supplement described in Example 1. This first supplement will be fed at the rate of 2 pounds per day per animal in supplying 500 milligrams of 1-methyl 2-mercaptoimidazole per 24 hours. In addition to this first described supplement, the cattle during this first 60 day period will be full-fed ground ear corn (about 20 pounds per animal daily) and from none to 3 pounds of hay daily per animal such that the total ration will furnish the vitamin A and other nutrient needs of cattle being finished for market but at the same time will not supply greatly excessive amounts of vitamin A in relation to commonly established body requirements. The rate of weight gain and the feed efficiency will be substantially higher during this initial 60 day period than would have occurred had the 1-methyl 2-mercaptoimidazole not been fed using this adequate finishing ration with controlled amounts of vitamin A activity in the form of carotene. The weights of the animals at the end of this initial 60 feeding period might be 1,000 pounds as compared with 970 pounds for similar animals not receiving the 1-methyl 2-mercaptoimidazole.

During a second feeding regimen of 60 days, a second protein supplement as described in Example 1 will be fed at the rate of 2 pounds per animal per day. This second protein supplement will supply 500 milligrams of 1-methyl 2-mercaptoimidazole and 8,000 I.U. of true vitamin A per 24 hours to each animal. In addition to this second described supplement, the cattle during this second 60 day period should be continued on a full-feed of ground corn and limited hay as described above. The rate of weight gain and the feed efficiency will also be substantially higher during this second 60 day period than would have occurred had the 1-methyl 2-mercaptoimidazole not been fed. The weights of the cattle at the end of this second feeding period might be 1175 pounds as compared with 1135 pounds for similar animals which had not received 1-methyl 2-mercaptoimidazole in either period.

Sheep weighing about 80 pounds initially should be fed rations somewhat similar to those described for cattle including the first and second described protein supplements fed respectively in periods 1 and 2 except the daily amounts of all feeds fed per animal should be about 10 percent that fed to cattle due to the smaller size of sheep. Also the length of the two feeding periods for sheep should be reduced to 30 days each rather than 60 days each as in the case of cattle. The final market weights of sheep receiving the 1-methyl 2-mercaptoimidazole compound during both periods might be 105 pounds as compared with 100 pounds for similar sheep which had not received the compound.

While in the foregoing specification this invention has been described in considerable detail and specific embodiments have been set forth, it will be apparent to those skilled in the art that the invention is capable of other embodiments and that many of the details set forth can be varied considerably without departing from the basic principles of the invention.

I claim:

1. The method of enhancing the effectiveness of a 2-mercaptoimidazole compound when orally administered to meat-producing ruminants for promoting growth and feed utilization, said compound being selected from the group consisting of 2-mercaptoimidazole and 1-alkyl 2-mercaptoimidazoles wherein the alkyl group contains from 1 to 5 carbon atoms, characterized by feeding to said ruminants during a first phase of said 2-mercaptoimidazole administration a diet averaging less than 1500 I.U. of vitamin A activity per pound of total ration, said vitamin A activity being present primarily in the form of carotene, said first phase feeding being continued for at least 30 days, and thereafter feeding to said ruminants during a second phase of said 2-mercaptoimidazole administration a diet containing supplementary vitamin A in the form of true vitamin A in an amount ranging from 100 to 1500 I.U. per pound of total ration.

2. The method of claim 1 wherein said diet during said first phase contains less than 800 I.U. of said vitamin A activity, and wherein said diet during said second phase contains from 200 to 1,000 I.U. per pound of ration of said supplementary vitamin A.

3. The method of claim 1 wherein said 2-mercaptoimidazole administration is continued for more than 60 days, said first phase extending over most of the first 60 days and said second phase extending substantially beyond said first 60 days.

4. The method of enhancing the effectiveness of a 2-mercaptoimidazole compound when orally administered to meat-producing ruminants for promoting growth and feed utilization, said compound being selected from the group consisting of 2-mercaptoimidazole and 1-alkyl 2-mercaptoimidazoles wherein the alkyl group contains from 1 to 5 carbon atoms, characterized by feeding to said ruminants for a period of at least 60 days a diet containing less than 800 I.U. of vitamin A activity per pound of ration, said vitamin A activity being present primarily in the form of carotene, and thereafter feeding to said ruminants for another period of at least 30 days a diet containing supplementary vitamin A in the form of true vitamin A in an amount ranging from 200 to 1,000 I.U. per pound of ration.

5. The method of enhancing the effectiveness of a 2-mercaptoimidazole compound when orally administered to beef cattle for promoting growth and feed utilization, said compound being selected from the group consisting of 2-mercaptoimidazole and 1-alkyl 2-mercaptoimidazole wherein the alkyl group contains from one to five carbon atoms, characterized by feeding to said beef cattle for at least 30 days a diet containing from 10 to 150 mg. of said 2-mercaptoimidazole compound per 100 pounds of body weight per 24 hours together with less than 4,500 I.U. of vitamin A activity per 100 pounds of body weight per 24 hours, said vitamin A activity being present primarily in the form of carotene, and thereafter feeding to said beef cattle during a second period of at least 30 days said 2-mercaptoimidazole compound in an amount ranging from 10 to 150 mg. per 100 pounds of body weight per 24 hours together with vitamin A in the form of true vitamin A in an amount ranging from 300 to 4,500 I.U. per 100 pounds of body weight per 24 hours.

6. The method of claim 5 in which said 2-mercaptoimidazole compound is 1-methyl 2-mercaptoimidazole.

7. The method of claim 5 in which said diet during said first period contains less than 2,400 I.U. of said vitamin A activity per 100 pounds of body weight per 24 hours, and in which said diet during said second period contains from 600 to 3,000 I.U. of said vitamin A per 100 pounds of body weight per 24 hours.

References Cited by the Examiner

UNITED STATES PATENTS

| | | | |
|---|---|---|---|
| 2,937,091 | 5/60 | Rosenberg | 99—2 |
| 3,041,173 | 6/62 | Burroughs | 99—2 |

A. LOUIS MONACELL, *Primary Examiner.*